US007681555B2

(12) United States Patent
Hargreaves et al.

(10) Patent No.: US 7,681,555 B2
(45) Date of Patent: Mar. 23, 2010

(54) CONTROLLER FOR A FUEL INJECTOR AND A METHOD OF OPERATING A FUEL INJECTOR

(75) Inventors: Andrew John Hargreaves, Boughton Under Blean (GB); Michael P Cooke, Gillingham (GB)

(73) Assignee: Delphi Technologies, Inc., Troy, MI (US)

( * ) Notice: Subject to any disclaimer, the term of this patent is extended or adjusted under 35 U.S.C. 154(b) by 34 days.

(21) Appl. No.: 11/805,494

(22) Filed: May 22, 2007

(65) Prior Publication Data

US 2007/0273247 A1 Nov. 29, 2007

(30) Foreign Application Priority Data

May 23, 2006 (GB) ................................ 0610230.5
Oct. 24, 2006 (GB) ................................ 0621156.9

(51) Int. Cl.
*F02M 51/00* (2006.01)
*G06F 17/00* (2006.01)

(52) U.S. Cl. ...................................... 123/490; 701/105

(58) Field of Classification Search ................. 123/467, 123/478, 480, 490, 500–502, 506, 498; 701/105; 310/317; 239/102.2, 585.1
See application file for complete search history.

(56) References Cited

U.S. PATENT DOCUMENTS 4,784,102 A * 11/1988 Igashira et al. .............. 123/447
5,235,954 A * 8/1993 Sverdlin ...................... 123/447
6,213,098 B1 * 4/2001 Kato et al. .................. 123/467
6,311,669 B1 * 11/2001 Przymusinski et al. ...... 123/300
6,364,221 B1 * 4/2002 Czimmek ................ 239/585.1
6,792,921 B2 * 9/2004 Forck et al. ................. 123/498
6,907,864 B2 * 6/2005 Takemoto ................... 123/478
6,986,339 B2 * 1/2006 Joos et al. ................... 123/498
7,034,437 B2 * 4/2006 Fukagawa et al. ...... 310/316.03

(Continued)

FOREIGN PATENT DOCUMENTS

JP 11-159372 6/1999

(Continued)

OTHER PUBLICATIONS

Japan Office Action dated Nov. 13, 2009.

*Primary Examiner*—Stephen K Cronin
*Assistant Examiner*—Johnny H Hoang
(74) *Attorney, Agent, or Firm*—Thomas N. Twomey

(57) ABSTRACT

A controller for controlling the operation of a fuel injector having a piezoelectric actuator which is operable by the application of a voltage drive profile across the actuator, the controller comprising inputs for receiving data relating to one or more engine parameters and a processor for determining a voltage drive profile for controlling the actuator in dependence upon the one or more engine parameters. The voltage drive profile is arranged to comprise an activating voltage component to initiate an injection event and a deactivating voltage component to terminate the injection event, the activating and deactivating voltage components being separated by a time interval $T_{ON}$. The controller further receives outputs for outputting the voltage drive profile as determined by the processor to the actuator, wherein the processor is arranged to set the time interval $T_{ON}$ greater than or equal to a predetermined pressure wave time period ($T_P$) of a pressure wave cycle within the injector.

14 Claims, 3 Drawing Sheets

U.S. PATENT DOCUMENTS

| | | | | |
|---|---|---|---|---|
| 7,089,914 | B2 * | 8/2006 | Joos et al. | 123/456 |
| 7,124,741 | B2 * | 10/2006 | Cagnoni et al. | 123/472 |
| 7,140,353 | B1 * | 11/2006 | Rauznitz et al. | 123/446 |
| 7,318,417 | B2 * | 1/2008 | Lang et al. | 123/467 |
| 2006/0152879 | A1 | 7/2006 | Rueger et al. | |

FOREIGN PATENT DOCUMENTS

| | | |
|---|---|---|
| JP | 2006-503533 | 1/2006 |

* cited by examiner

CONTROLLER FOR A FUEL INJECTOR AND A METHOD OF OPERATING A FUEL INJECTOR

TECHNICAL FIELD

The invention relates to a controller for a fuel injector and a method of operating a fuel injector. More specifically, the invention relates to a method of operating a piezoelectrically actuated fuel injector in order to improve the consistency of pilot fuel injection events.

BACKGROUND OF THE INVENTION

In the context of an internal combustion engine, it is known to deliver fuel into the cylinders of the engine by means of a fuel injector. One such type of fuel injector that permits precise metering of fuel delivery is a so-called 'piezoelectric injector'.

With reference to FIG. 1, a piezoelectric injector 2 includes a piezoelectric actuator 4 that is operable to control the position of an injector valve needle 6 relative to a valve needle seat 8. Depending on a drive voltage profile 'V' applied to the piezoelectric actuator 4, the valve needle 6 is either caused to disengage the valve seat 8, in which case fuel is delivered into an associated combustion chamber (not shown) through a set of nozzle outlets 10, or is caused to engage the valve seat 8, in which case fuel delivery is prevented.

The piezoelectric injector is controlled by an injector control unit (ICU) 20 that forms an integral part of an engine control unit (ECU) 22. The ECU continuously monitors a plurality of engine parameters 24 and feeds an engine power requirement signal to the ICU 20. The ICU 20 calculates (using processor 21) a required injection event sequence to provide the required power for the engine and outputs a voltage pulse profile 25 to an injector drive circuit 26. In turn, the injector drive circuit 26 applies the voltage drive profile 25 to the injector via a high side voltage signal $V_{HI}$ and a low side voltage signal $V_{LO}$.

In order to initiate an injection, the drive circuit 26 causes the differential voltage between $V_{HI}$ and $V_{LO}$ to transition from a high voltage (typically 250V) at which no fuel delivery occurs, to a relatively low voltage (typically 50 V), which initiates fuel delivery. An injector responsive to this drive waveform is referred to as a 'de-energise to inject' injector.

Such a fuel injector is operable to deliver one or more injections of fuel within a single injection event. For example, the injection event may include one or more so-called 'pre' or 'pilot' injections, a main injection, and one or more 'post' injections. In general, several such injections within a single injection event are preferred to increase combustion efficiency of the engine.

A typical injector drive voltage profile applied to the injector during an injection event is shown in FIG. 2 and a corresponding ideal delivery rate profile is shown in FIG. 3.

The injector drive voltage profile comprises first and second pilot discharge pulses P1 and P2 and a single main injection discharge pulse PMAIN. The magnitude and duration of each of the pilot discharge pulse P1, P2 are substantially equal. Accordingly, the delivery rate for each pilot injection P1, P2 is substantially equal and, thus, the volume of fuel delivered (the area under the curve) is consistent between pilot injections.

It has been observed, however, that the actual delivery quantity between pilot injections for the same voltage discharge profile varies considerably. For example, FIG. 4 shows a delivery rate profile that is observed in practice in which the fuel delivered for the second pilot injection is greater than the fuel delivered during the first pilot injection.

The purpose of a pilot injection is to deliver a precise amount of fuel into the combustion chamber prior to the main injection in order to initiate the combustion process gradually. Therefore, a variation in fuel delivery between pilot injections is undesirable since it reduces the controllability of the combustion process. Therefore, a method of regulating the volume of fuel delivered between pilot injections is required.

SUMMARY OF THE INVENTION

Against this background, according to a first aspect of the present invention there is provided a controller for controlling the operation of a fuel injector having a piezoelectric actuator, the actuator being operable by the application of a voltage drive profile across the actuator, the controller comprising: inputs for receiving data relating to one or more engine parameters; a processor for determining a voltage drive profile for controlling the actuator in dependence upon the one or more engine parameters, the voltage drive profile being arranged to comprise an activating voltage component to initiate an injection event and a deactivating voltage component to terminate the injection event, the activating and deactivating voltage components being separated by a time interval $T_{ON}$; outputs for outputting the voltage drive profile as determined by the processor to the actuator wherein the processor is arranged to set the time interval $T_{ON}$ greater than or equal to a predetermined pressure wave time period ($T_P$) of a pressure wave cycle within the injector.

The present invention provides the advantage of improving the fuel delivery consistency between injection events by compensating for pressure wave effects within the injector. It has been noted that by increasing the injector "on" time (the time interval between start of discharge and start of charge) such that it is greater than or equal to the time it takes a pressure wave (caused by the disengagement and re-engagement of a valve needle during an injector event) to travel up the fuel passages within the injector and then return back down to the injector tip, the effects of the pressure wave on the subsequent injection even can be reduced.

Conveniently, the injector on period is greater than the pressure wave period. Preferably, the injector on period is chosen such that it is a multiple of the pressure wave time period.

As a consequence of increasing the injector on time there will be an increase in the fuel injected by the injector. Conveniently, if it is desired to maintain fuelling levels then the controller can reduce the peak voltage levels of the voltage drive profile sent to the actuator in order to maintain a constant amount of injected fuel at any given engine operating condition.

Conveniently, the controller maintains a stored record or pressure wave time periods in dependence on various engine operating conditions.

Preferably, the controller comprises a function map of the pressure wave time period in dependence on engine operating parameters and refers to the function map when setting the value for the injector on time. The function map may conveniently be stored in a data store within or associated with the controller.

The controller of the first aspect of the present invention may conveniently be incorporated within a vehicle's engine control unit.

According to a second aspect of the present invention there is provided a method of operating a fuel injector having a piezoelectric actuator operable by applying an activating voltage level across the actuator to initiate an injection event and a deactivating voltage across the actuator to terminate an injection event, the method comprising: applying an activating voltage to the actuator so as to initiate an injection event, and, after a predetermined time interval ($T_{ON}$); applying a deactivating voltage to the actuator so as to terminate injection; wherein the predetermined time interval is selected to be greater than or equal to a predetermined pressure wave time period ($T_P$) of a pressure wave cycle within the injector.

The predetermined pressure wave time period may be determined in one of two ways. The time period can physically be measured on a test rig prior to normal engine usage and the measured values stored (e.g. in a function map) for later use. Alternatively, the time period can be calculated based on the known dimensions and geometry of the fuel delivery system.

Preferred features of the first aspect of the invention may also be applied to the second aspect of the invention.

BRIEF DESCRIPTION OF THE DRAWINGS

Reference has already been made to FIGS. 1, 2, 3 and 4 which show, respectively, a piezoelectric injector having associated control means, a known drive voltage profile for applying to the injector and corresponding ideal and actual injection delivery rate profiles corresponding to the known drive voltage profile. The invention will now be described, by way of example only, with reference to the following drawings in which.

DETAILED DESCRIPTION

Figure 5:
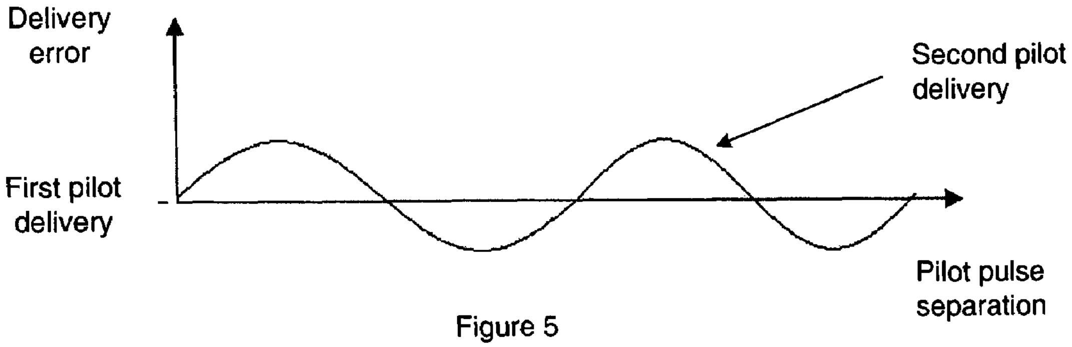
FIG. 5 is a graph of the difference in fuel delivery volume between pilot injection events (hereafter 'delivery error') against temporal separation of pilot voltage discharge pulses.

Referring to FIG. 5, it has been observed that varying the temporal separation of the pilot injection voltage discharge pulses results in a cyclical variation in the delivery error between injections. The cause of this phenomenon is the pressure wave effects within the injector 2 as the valve needle 6 is disengaged and re-engaged with the valve seat 8 during an injection event. When the valve needle 6 is disengaged from the valve seat 8 to initiate a pilot injection, a pressure wave is generated that travels up the internal fuel passages within the injector 2. The pressure wave then reflects back down the injector 2 to its tip. If a high pressure wave front coincides with the valve needle 6 lifting from the valve seat 8, the effect is to increase the delivery of fuel through the nozzle outlets 10 during the second pilot injection. Conversely, if a low pressure wave front coincides with the valve needle 6 lifting from the valve seat 8 the effect is to reduce the volume of fuel delivered through the outlets 10 during the second pilot injection.

The Applicant has identified that it is possible to compensate for the pressure wave effects in the injector 2 and guard against substantial variation between pilot injections by modifying the pilot injection voltage discharge waveform.

The proposed solution is to minimise the delivery volume variation to control two aspects of the discharge profile:

i) reduce the magnitude of peak voltage discharge level for both pilot injections; and ii) increase the time interval between the start of discharge and the start of charge (hereinafter "injector on time" $T_{ON}$) so as to be greater than or approximately equal to a pressure wave time period.

Figures 6, 7:
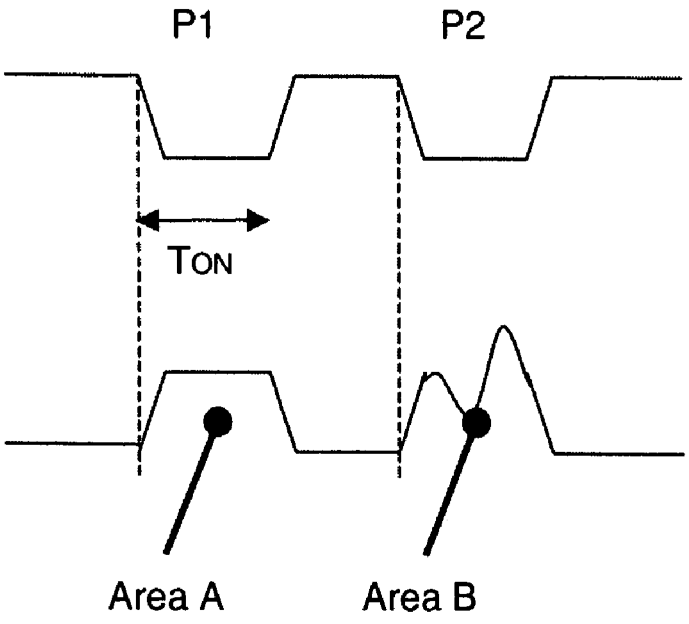
FIG. 6 is a voltage discharge profile for first and second pilot injections according to an embodiment of the invention.
FIG. 7 is a delivery rate profile of first and second pilot injections corresponding to the voltage discharge profile in FIG. 6.

The above aspects are shown in FIGS. 6 and 7, which show the voltage discharge profile for pilot injections P1 and P2, and the corresponding fuel delivery rate.

As a result of the above steps, during the second pilot injection P2, the valve needle opening duration is approximately equal to the time period for a single pressure oscillation. Thus, the fuel pressure at the nozzle outlets increases to a relatively high pressure and a relatively low pressure during the same pilot delivery period. The result is that the area under the second pilot injection delivery profile (Area B) is substantially equal to the area under the first pilot injection delivery profile (Area A). Put another way, the total delivery volume is substantially unaffected by the standing wave set up in the injector nozzle and the pilot injection separation.

The above voltage discharge waveform is applicable to a 'de-energise to inject' injector. However, it should be appreciated that the invention is also applicable to a so-called 'energise to inject' injector. In such an injector, an injection event is initiated by applying a voltage charge pulse to the actuator rather than a voltage discharge pulse.

In other words, in the "de energise to inject" case the "activating voltage component" of the voltage drive profile is a voltage discharge pulse and the "deactivating voltage component" is a voltage charge pulse. In the "energise to inject case" the "activating voltage component" of the voltage drive profile is a voltage charge pulse and the "deactivating voltage component" is a voltage discharge pulse It is to be appreciated that that the injector on time $T_{ON}$ need not be selected to be equal to the pressure wave time period. In another embodiment, the injector on time $T_{ON}$ may be selected to be greater than the pressure wave time period.

It is noted that the effect of the present invention will be to reduce the delivery error as depicted in FIG. 5. In other words, once the method and controller of the present invention are activated the peak amplitudes of the cyclical variation of FIG. 5 will reduce.

Figure 1:
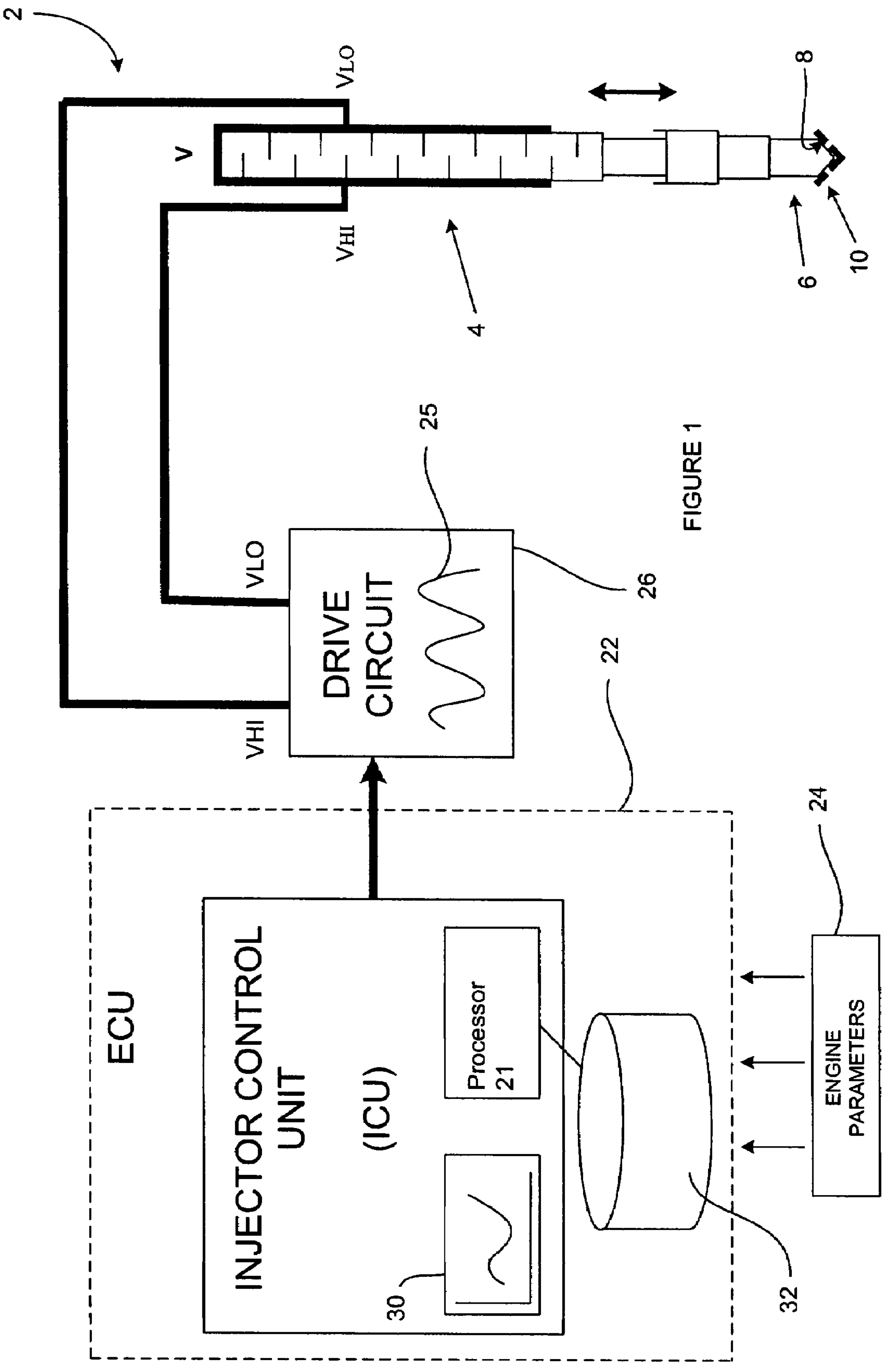
Figure 2:
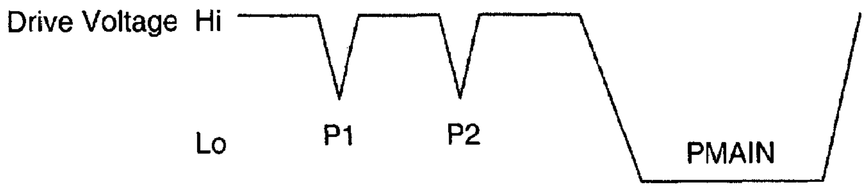
Figure 3:
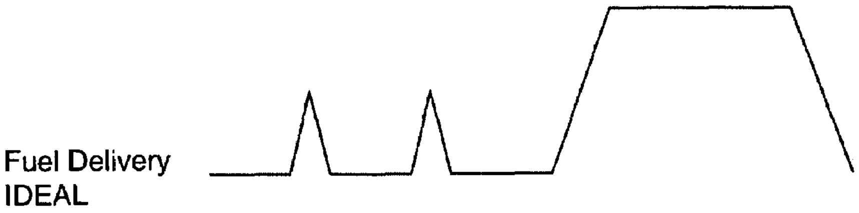
Figure 4:
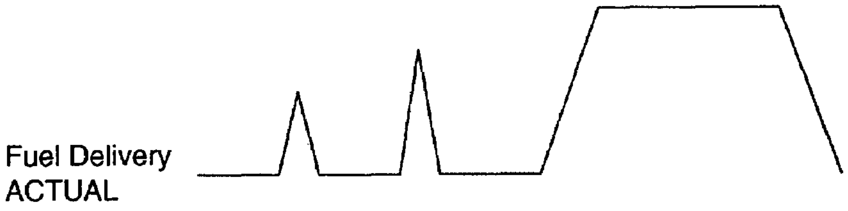

The pressure wave time period may be calculated with reference to the geometry and dimensions of the fuel injection system or alternatively can be measured on a test rig. In either case, the pressure wave time period for a given engine operating parameter may conveniently be stored in a function map 30 within the controller 20 (as indicated in FIG. 1). As an alternative the function map 30 may be stored in a data store 32 either in the ECU 22 or elsewhere within the vehicle.

It will be understood that the embodiments described above are given by way of example only and are not intended to limit the invention, the scope of which is defined in the appended claims. It will also be understood that the embodiments described may be used individually or in combination.

The invention claimed is:

1. A controller for controlling the operation of a fuel injector having a piezoelectric actuator, the actuator being operable by an application of a voltage drive profile across the actuator, the controller comprising:

inputs for receiving data relating to one or more engine parameters;

a processor for determining a voltage drive profile for controlling the actuator in dependence upon the one or more engine parameters, the voltage drive profile being arranged to comprise a first pilot injection event, a second pilot injection event, a main injection event, an activating voltage component to initiate the second pilot injection event and a deactivating voltage component to terminate the second pilot injection event, the activating and deactivating voltage components being separated by a time interval $T_{ON}$; and outputs for outputting the voltage drive profile as determined by the processor to the actuator, wherein the processor is arranged to set the time interval $T_{ON}$ greater than or equal to a predetermined pressure wave time period ($T_P$) of a pressure wave cycle within the injector.

2. A controller as claimed in claim 1, wherein $T_{ON}>T_P$.

3. A controller as claimed in claim 1, wherein $T_{ON}=nT_P$, where n=1, 2, 3.

4. A controller as claimed in claim 1, wherein the processor is arranged to reduce peak voltage levels within a voltage drive profile as $T_{ON}$ is varied so as to maintain a fixed fuel delivery amount through the injector.

5. A controller as claimed in claim 1, wherein predetermined pressure wave time period values, in dependence upon the one or more engine parameters, are stored in the controller.

6. A controller as claimed in claim 1, further comprising a function map of $T_P$ in dependence upon engine parameters and wherein the controller is arranged to refer to the function map when setting $T_{ON}$.

7. A controller as claimed in claim 6, further comprising a data store for storing the function map.

8. A controller for controlling the operation of a fuel injector having a piezoelectric actuator, the actuator being operable by an application of a voltage drive profile across the actuator, the controller comprising:

inputs for receiving data relating to one or more engine parameters;

a processor for determining a voltage drive profile for controlling the actuator in dependence upon the one or more engine parameters, the voltage drive profile being arranged to comprise a first pilot injection event, a second pilot injection event, a main injection event, an activating voltage component to initiate the second pilot injection event and a deactivating voltage component to terminate the second pilot injection event, the activating and deactivating voltage components being separated by a time interval $T_{ON}$;

outputs for outputting the voltage drive profile as determined by the processor to the actuator; and a function map of a predetermined pressure wave time period ($T_P$) of a pressure wave cycle within the injector in dependence upon engine parameters, wherein (i) the processor is arranged to set the time interval $T_{ON}$ greater than or equal to the predetermined pressure wave time period ($T_P$);

(ii) the processor is arranged to set $T_{ON}=nT_P$, where n=1, 2, 3 . . . ; and (iii) the controller is arranged to refer to the function map when setting $T_{ON}$.

9. A method of operating a fuel injector having a piezoelectric actuator operable by applying an activating voltage level across the actuator to initiate an injection event and a deactivating voltage across the actuator to terminate an injection event, the method comprising:

determining a voltage drive profile for controlling the actuator, the voltage drive profile comprising a first pilot injection event, a second pilot injection event, and a main injection event;

applying an activating voltage to the actuator so as to initiate the second pilot injection event, and, after a predetermined time interval ($T_{ON}$);

applying a deactivating voltage to the actuator so as to terminate the second pilot injection event;

wherein the predetermined time interval ($T_{ON}$) is selected to be greater than or equal to a predetermined pressure wave time period ($T_P$) of a pressure wave cycle within the injector.

10. A method as claimed in claim 9, wherein prior to the first applying step, the pressure wave time period of a pressure wave cycle within the injector is measured on a test rig.

11. A method as claimed in claim 10, wherein the pressure wave time period is measured for a range of engine operating conditions and the measured pressure wave time periods are stored in a function map.

12. A method as claimed in claim 9, wherein prior to the first applying step, the pressure wave time period of a pressure wave cycle within the injector is calculated based on the dimensions of the fuel injector and associated fuel injector system.

13. A method as claimed in claim 12, wherein the pressure wave time period is calculated for a range of engine operating conditions and the calculated pressure wave time periods are stored in a function map.

14. A controller for controlling the operation of a fuel injector having a piezoelectric actuator, the actuator being operable by an application of a voltage drive profile across the actuator, the controller comprising:

inputs for receiving data relating to one or more engine parameters;

a processor for determining a voltage drive profile for controlling the actuator in dependence upon the one or more engine parameters, the voltage drive profile being arranged to comprise a first pilot injection event, a second pilot injection event, a main injection event, an activating voltage component to initiate the second pilot injection event and a deactivating voltage component to terminate the second pilot injection event, the activating and deactivating voltage components being separated by a time interval $T_{ON}$;

outputs for outputting the voltage drive profile as determined by the processor to the actuator, wherein the processor is arranged to set the time interval $T_{ON}$ substantially equal to a predetermined pressure wave time period ($T_P$) of a pressure wave cycle within the injector.

* * * * *